United States Patent [19]

Yamada

[11] Patent Number: 4,948,370

[45] Date of Patent: Aug. 14, 1990

[54] TRANSMISSION RATIO CONTROL SYSTEM FOR A CONTINUOUSLY VARIABLE TRANSMISSION

[75] Inventor: Kenichi Yamada, Musashino, Japan

[73] Assignee: Fuji Jukogyo Kabushiki Kaisha, Tokyo, Japan

[21] Appl. No.: 408,131

[22] Filed: Sep. 15, 1989

[30] Foreign Application Priority Data

Sep. 24, 1988 [JP] Japan ................................ 63-240431
Sep. 24, 1988 [JP] Japan ................................ 63-240432
Sep. 24, 1988 [JP] Japan ................................ 63-240433
Sep. 24, 1988 [JP] Japan ................................ 63-240434

[51] Int. Cl.[5] ............................................ F16H 11/02
[52] U.S. Cl. .................................... 474/28; 74/867
[58] Field of Search .................... 474/11, 12, 17, 18, 474/28, 69, 70; 74/867-869

[56] References Cited

U.S. PATENT DOCUMENTS

| | | | |
|---|---|---|---|
| 4,510,822 | 4/1985 | Yamamuro et al. | 474/28 X |
| 4,534,243 | 8/1985 | Yokoyama et al. | 474/28 X |
| 4,627,313 | 12/1986 | Sakai | 474/28 X |
| 4,669,336 | 6/1987 | Okada et al. | 74/867 |

FOREIGN PATENT DOCUMENTS 54-157930 12/1979 Japan.

*Primary Examiner*—Thuy M. Bui
*Attorney, Agent, or Firm*—Martin A. Farber

[57] ABSTRACT

A continuously variable transmission has a drive pulley, a driven pulley, a belt engaged with both pulleys, a transmission ratio control valve having a spool for controlling oil supplied and drained to and from a cylinder of the drive pulley. A check valve is provided in a drain passage for the drain oil. The check valve has a drain port and a spool provided for closing the drain port. A shift lock device is provided to shift the spool so as to close the drain port when wheels of a vehicle are locked, thereby preventing the belt and pulleys from shifting to a larger transmission ratio position.

4 Claims, 16 Drawing Sheets

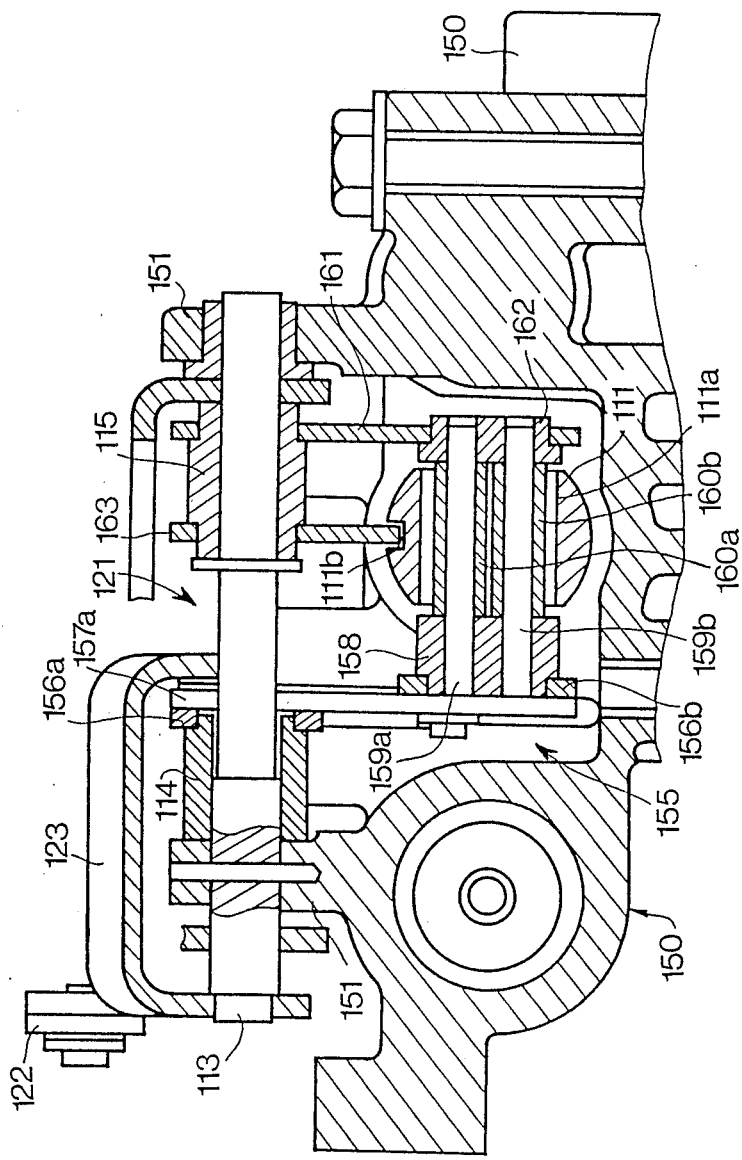

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for preventing a belt from slipping on pulleys of the belt drive transmission.

A known control system for a continuously variable belt-drive transmission disclosed in Japanese Patent Application Laid-Open No. 54-157930 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

A rotation speed sensor in the form of a pitot tube is provided adjacent the drive pulley to measure the speed of the oil in an annular groove formed on the periphery of the drive pulley so that a pitot pressure which is proportional to the engine speed is detected. The transmission ratio control valve is applied with the pitot pressure at one end and with a spring load dependent on accelerator pedal depressing degree at the other end.

Thus, the transmission ratio control valve operates to decide the transmission ratio in accordance with the opening degree of a throttle valve of an engine and the speed of the engine. The line pressure control valve is adapted to control the line pressure in accordance with the transmission ratio and the engine speed, that is, pitot pressure. The line pressure is controlled to prevent the belt from slipping on pulleys in order to transmit the output of the engine.

At the start of the vehicle, the transmission ratio is set at a maximum value. When the engine speed exceeds a predetermined value, an electromagnetic clutch engages, so that the vehicle is started. When the vehicle speed and engine speed exceed set values under a driving condition, the transmission ratio starts to change (to upshift). The transmission ratio is automatically and continuously reduced, even if the engine speed is kept constant. Thus, the vehicle speed increases with the reduction of the transmission ratio.

The electromagnetic clutch is automatically disengaged in dependency on engine speed or vehicle speed to prevent the stall of the engine. In a steady state, the clutch is engaged so that the drive pulley is directly connected to the engine. Accordingly, sufficient pitot pressure is generated to control the transmission ratio.

To the contrary, the pitot pressure is reduced when the wheels are locked as a result of a sudden braking on a road having a low friction coefficient such as a snowy road. Such a phenomenon is explained with reference to FIGS. 9a to 9e.

When the wheels are locked, the wheel speed Vw rapidly decreases to zero, while the vehicle speed Vm does not quickly decrease because of the slipping of wheels on the road. Since a vehicle speed sensor is provided to detect the speed of an output shaft of the transmission, the vehicle speed sensor produces a signal which means the vehicle speed largely decreases. As a result, the electro magnetic clutch is disengaged, and the speed of the drive pulley largely reduces. Accordingly, the pitot pressure Pt and hence primary pressure Pp in an oil chamber of the servo device of the drive pulley rapidly decrease. Since the drive and driven pulleys do not rotate, the belt is held by the gripping operation of the pulleys at a position where the pulleys stop, providing a small transmission ratio i. Since the pitot pressure Pt is zero, the transmission ratio control valve is in a large transmission ratio providing state. Accordingly, the hydraulic system intends to shift the belt and pulley device to the large transmission ratio position. However, since the belt is gripped by the pulleys, positions of the pulleys and belt can not be shifted. Thus, the transmission is held at the large transmission ratio position.

When the brake pedal is released, the wheels are unlocked so that the wheel speed is quickly increased to coincide with the vehicle speed Vm. Therefore, the driven pulley is driven by the wheels to rotate the drive pulley through the belt. When the pulleys and belt start to rotate, the gripping force reduces, so that the belt and pulley device is quickly shifted to the large transmission ratio position. Since the inertial mass of a driven member of the electromagnetic clutch, the drive pulley and other members provided between the clutch and the drive pulley is large, a large primary pressure is necessary to grip the belt so as to rotate the drive pulley, the driven member and others. However, since the pitot pressure is still low, the primary pressure Pp is low. As a result, the belt slips on the drive pulley, causing damaging of the belt. In addition, the drive pulley is gradually rotated, so that the increase of the pitot pressure delays. Consequently, the transmission ratio is not accurately controlled.

SUMMARY OF THE INVENTION

The object of the present invention is to provide a transmission ratio control system wherein the slip of the belt on the drive pulley of the continuously variable transmission may be prevented.

According to the present invention, there is provided a control system for a continuously variable transmission for transmitting the power of an automotive engine to driving wheels of a vehicle, the system comprising a drive pulley having a hydraulically shiftable disc and a hydraulic cylinder for operating the disc, a driven pulley having a hydraulically shiftable disc and a hydraulic cylinder for operating the disc, a belt engaged with both pulleys, a hydraulic circuit having a pump for supplying oil to both the hydraulic cylinders, a transmission ratio control valve having a plunger slidably mounted in a valve body, a spool slidably mounted in the valve body for controlling the oil supplied to the cylinder of the drive pulley and the oil drained from the cylinder to change the transmission ratio, and at least one spring provided between the plunger and the spool, a drain passage for draining the oil in the hydraulic cylinder of the drive pulley through the transmission ratio control valve and shifting means for shifting the plunger of the transmission ratio control valve in accordance with depression of an accelerator pedal of the vehicle.

The system comprises a check valve provided in the drain passage, the check valve having a cylindrical spool slidably mounted in a body, a ball provided in the spool, a spring provided for urging the ball to close a drain port, the cylindrical spool being arranged to be shifted against the spring so as to close the drain port, an actuating member slidably mounted in the body so as to shift the cylindrical spool, detector means for detecting the locking of wheels of the vehicle and for producing a wheel lock signal, shift locking means responsive to the lock signal for actuating the actuating member to shift the cylindrical spool so as to close the drain port, whereby the draining of the oil in the cylinder of the drive pulley is stopped.

The other objects and features of this invention will be apparently understood from the following description with reference to the accompanying drawings.

BRIEF DESCRIPTION OF DRAWINGS

FIG. 4a is a sectional view of the valve block taken along a line IV—IV of FIG. 3, showing a modulator device;

DETAILED DESCRIPTION OF THE PREFERRED EMBODIMENTS

Figure 1A:
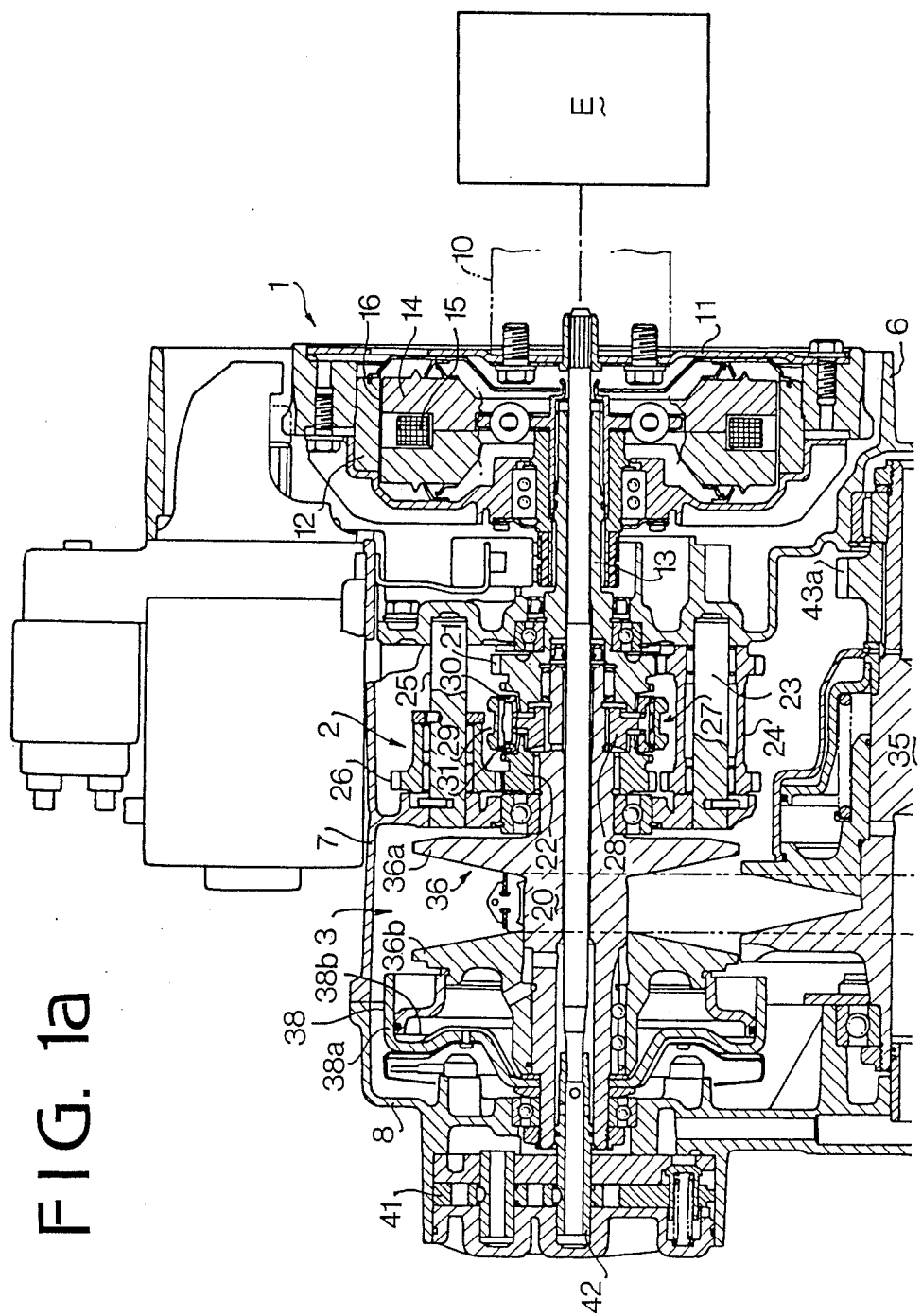
FIGS. 1a and 1b show a sectional view of a continuously variable belt-drive transmission to which the present invention is applied.
Figure 1B:
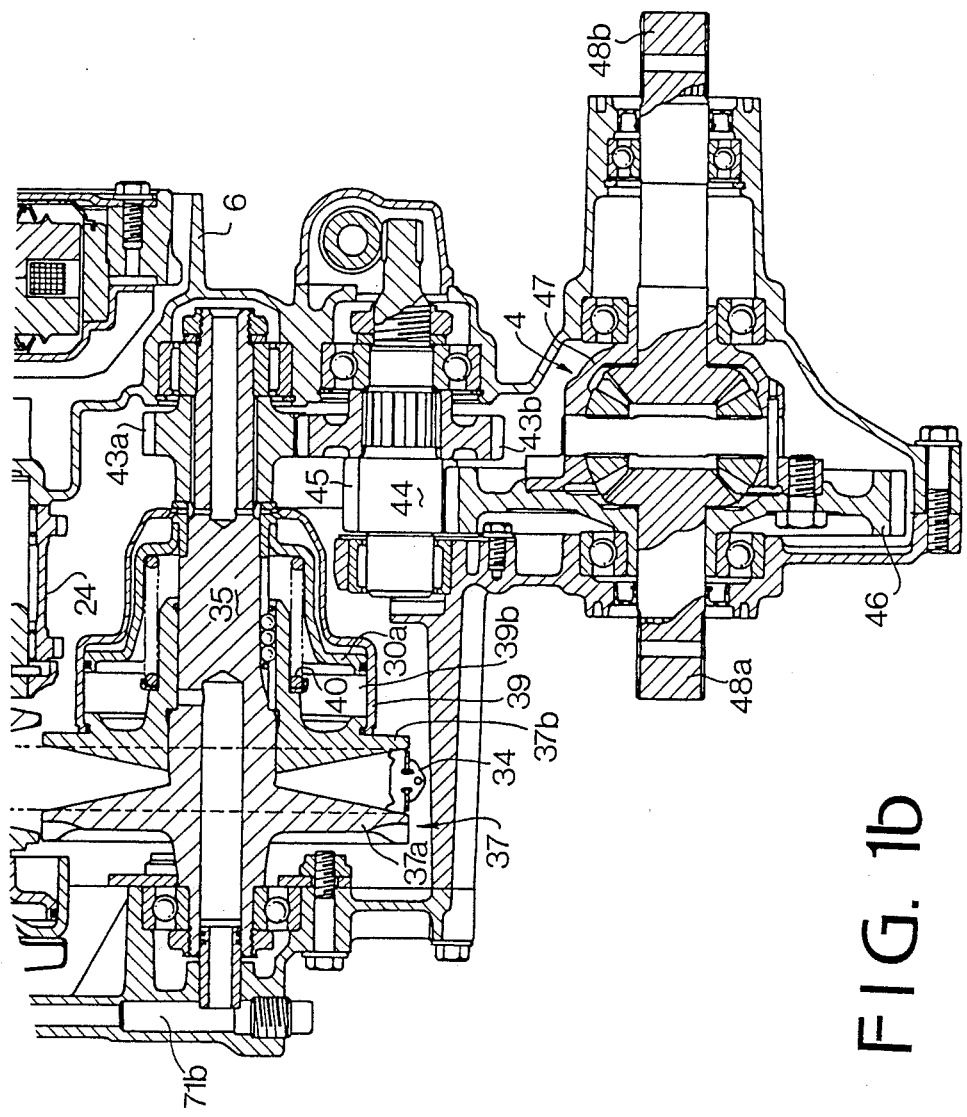

FIGS. 1a and 1b show a power transmission system with a continuously variable belt-drive automatic transmission for a motor vehicle, to which the present invention is applied. An engine E is transversely mounted on a motor vehicle at a front portion thereof. The power transmission system comprises an electromagnetic powder clutch 1, a selector device 2, a continuously variable belt-drive transmission 3, and a final reduction device 4 for front wheels. The electromagnetic powder clutch 1 is provided in a housing 6. The selector device 2, transmission 3 and final reduction device 4 are provided in a main housing 7 and a side housing 8. A crankshaft 10 of the engine E is connected to an annular drive member 12 through a drive plate 11 of the electromagnetic powder clutch 1. The electromagnetic powder clutch 1 comprises a driven member 14, a magnetizing coil 15 provided in the driven member 14. The driven member 14 has its outer periphery spaced from the inner periphery of the drive member 12 by a gap 16. Powder of magnetic material is provided in the gap 16. The driven member 14 is secured to an input shaft 13 of the belt-drive transmission 3. The coil 15 is supplied through brushes and slip rings with current from a control circuit for the electromagnetic powder clutch 1.

When the magnetizing coil 15 is excited by the clutch current, driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

The selector device 2 is provided between the input shaft 13 and a main shaft 20. The main shaft 20 is cylindrical and is disposed coaxially with the input shaft 13. The selector device 2 comprises a drive gear 21 integral with input shaft 13, a reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N range) or a parking position (P range) of a selector lever 117 (FIG. 2b), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range position (D, Ds ranges). When the sleeve 29 is engaged with the gear 22, the input shaft 13 is connected to the main shaft 20 through gears 21, 24, 26 and 22 to provide a reverse drive range position (R range).

The main shaft 20 has an axial passage in which an oil pump driving shaft 42 connected to crankshaft 10 is mounted. In the transmission 3, an output shaft 35 is provided in parallel with the main shaft 20. A drive pulley 36 and a driven pulley 37 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder 38a secured to the main shaft 20 to form a servo device 38 having a chamber 8b.

A fixed conical disc 37a of the driven pulley 37 is formed on the output shaft 35 opposite the movable disc 36b and a movable conical disc 37b is slidably mounted on the output shaft 35 opposite disc 36a. The movable conical disc 37b also slides in a cylinder 39a secured to the output shaft 35 to form a servo device 39. A chamber 39b of the servo device 39 is communicated with an oil pump 41 through a passage 71b. A spring 40 is provided to urge the movable conical disc 37b to the fixed conical disc 37a. A drive belt 34 engages with the drive pulley 36 and the driven pulley 37. The movable disc 36b has an area exposed to the line pressure which is larger than the corresponding area of the movable disc 37b.

Secured to the output shaft 35 is a drive gear 43a which engages with an intermediate reduction gear 43b on an intermediate shaft 44. An intermediate gear 45 on the intermediate shaft 44 engages with a final gear 46. Rotation of the final gear 46 is transmitted to axles 48a and 48b of front driving wheels through a differential 47.

Figure 2A:
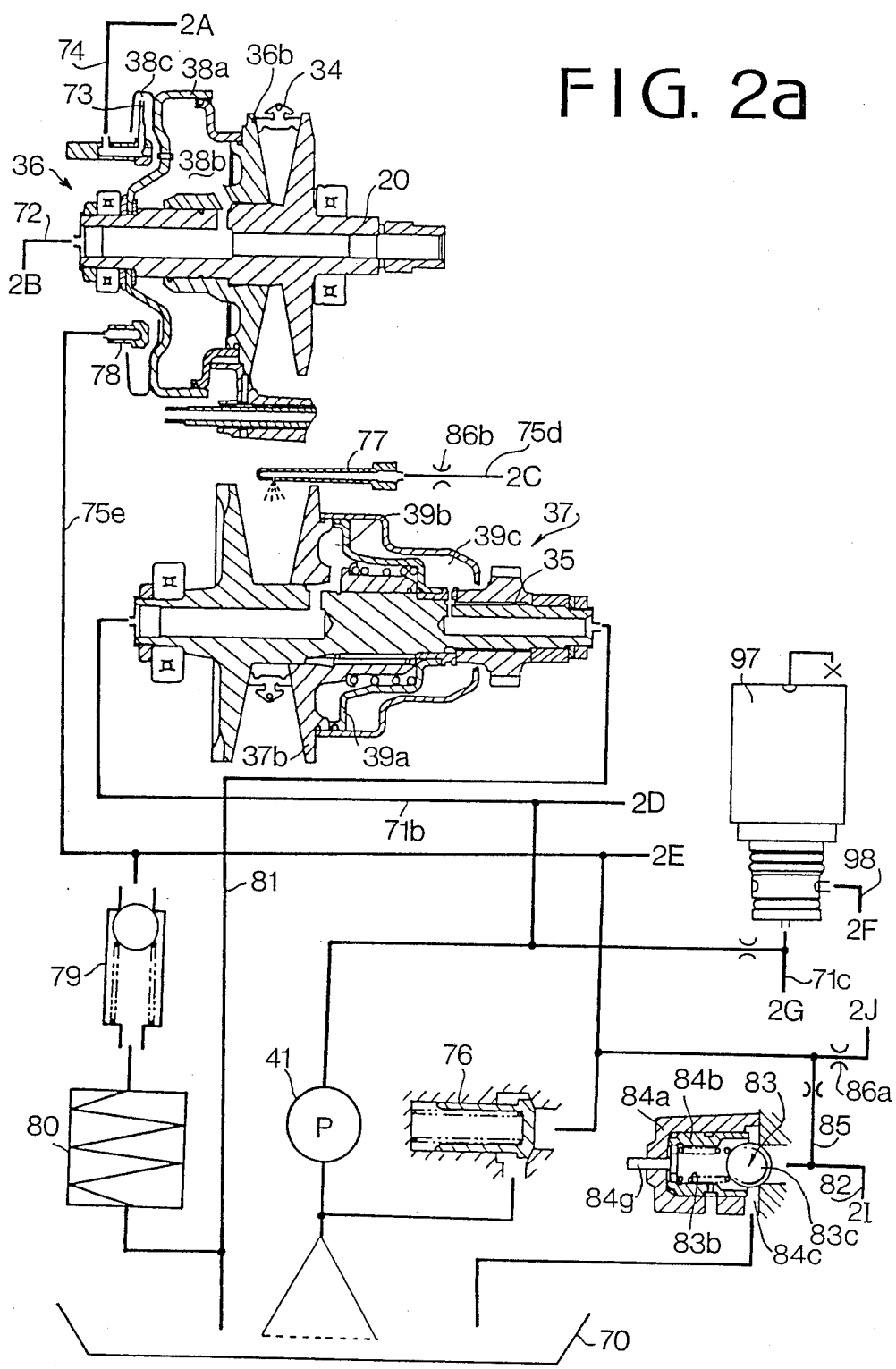
FIGS. 2a and 2b show a hydraulic control circuit according to the present invention.
Figure 2B:
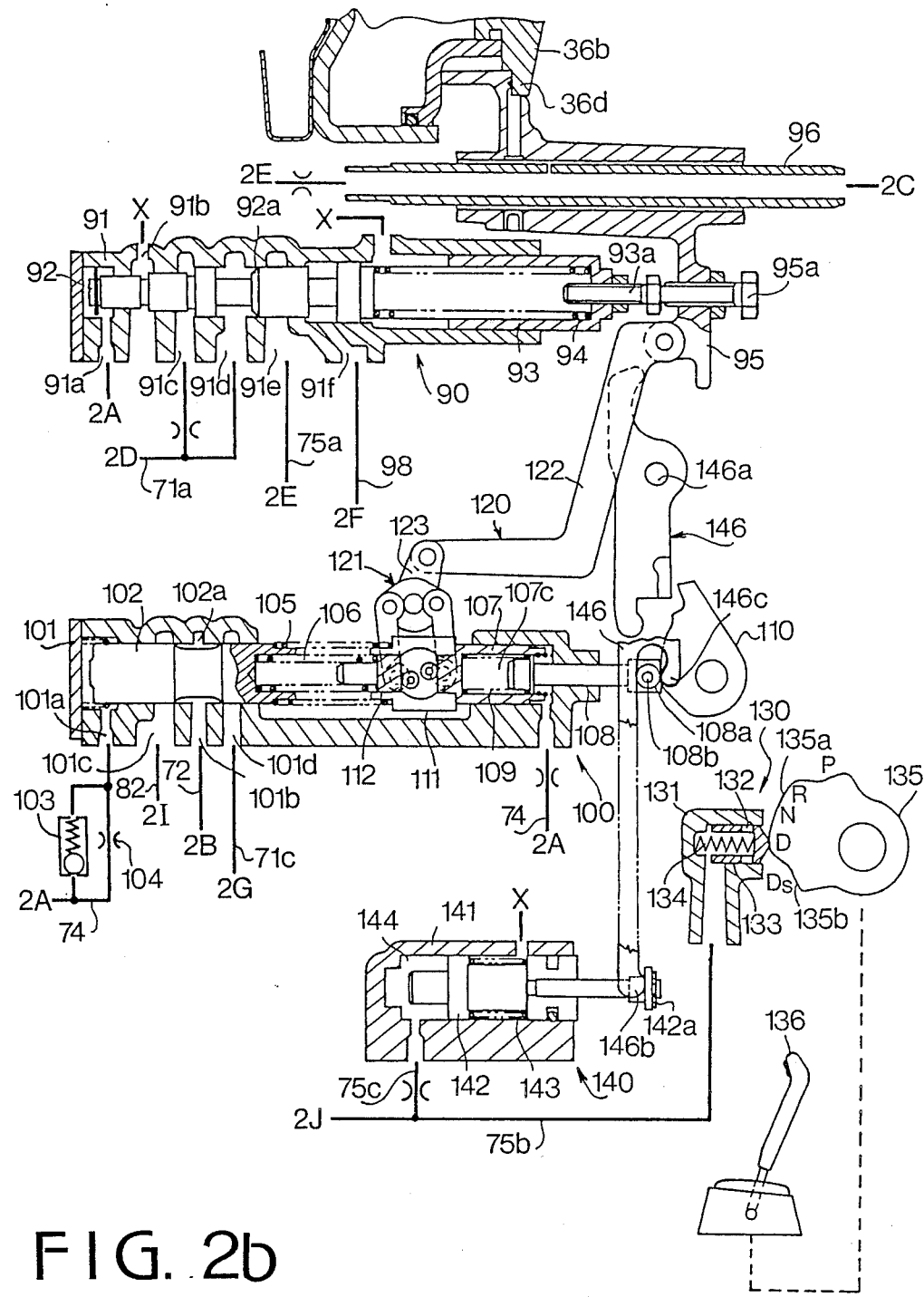

FIGS. 2a to 2c show a hydraulic control circuit according to the present invention. The circuit is provided with a pressure regulator valve 90 and a transmission ratio control valve 100.

The pressure regulator valve 90 comprises a valve body 91, spool 92, spring 94 provided between a spring retainer 93 and one end of the spool 92 for urging the spool to the left.

The transmission ratio control valve 100 comprises a valve body 101, a spool 102, an operating plunger 107, and a modulator 120 for controlling the pressure applied to the spool 102. Oil in an oil reservoir 70 is supplied to a port 91c of pressure regulator valve 90 through a passage 71a by the pump 41. An oil passage 71b connected to the passage 71a is communicated with the driven pulley servo chamber 39b. An oil passage 71c is further communicated with the drive pulley servo chamber 38b through ports 101d and 101b of the transmission ratio control valve 100 and a passage 72. Oil flows back from a port 91e of the regulator valve 90 to the inlet of the pump 41 through drain passages 75a and a relief valve 76. A drain port 101c of the transmission ratio control valve 100 is communicated with the oil reservoir 70 through a drain passage 82 and a check valve 83.

The drive pulley cylinder 38a has an annular inside groove 38c in which a rotation speed sensor 73 in the form of a pitot tube is provided for measuring the speed of the oil in the groove 38c that is the speed of the main shaft 20 which is proportional to the engine speed. The pitot pressure produced by the rotation speed sensor 73 is applied to the end chambers 91a of the valve 90 through passages 74. The pitot pressure is further applied to the end chamber 101a of the valve 100 through a check valve 103 or an orifice 104.

The port 91e of the pressure regulator valve 90 is communicated with a select position detecting valve 130 at upstream of the relief valve 76 through a passage 75a and a passage 75b having an orifice 86a and further with an actuator 140 for the transmission ratio control valve 100 through a passage 75c. The passage 75a is communicated with the drain passage through a passage 85.

A sensor shoe 95 for detecting the actual transmission ratio is slidably mounted on a lubricating oil pipe 96 which is parallel with the axis of the spool 92. A bolt 95a secured to an end of the sensor shoe 95 engages with an end of a bolt 93a secured to the spring retainer 93, and the other end of the sensor shoe 95 engages with an outside periphery 36d of the movable disc 36b. Thus, the position of the movable disc 36b which means the transmission ratio during the operation is transmitted to the spool 92 through the spring 94. At the end of the valve body 91, opposite to the spring 94, pitot pressure is applied to the end chamber 91a, and oil pressure is applied to port 91c through the passage 71a. A port 91b which is provided between the chamber 91a and the port 91c for preventing the leakage of the oil dependent on the line pressure, is communicated with the oil reservoir 70 through drain passages The port 91d is communicated with the port 91e through a chamber formed on a land 92a of the spool 92 when the spool is shifted to the right, so that the line pressure can be regulated. A port 91f provided adjacent the port 91e is communicated with the passage 71c through a passage 98 and a solenoid operated change-over valve 97. The solenoid operated valve 97 is a three-way valve provided to selectively communicate the passage 71c with the port 91f when a solenoid is energized, or with a drain port when the solenoid is de-energized.

Thus, the spool 92 is applied with the pitot pressure and oil pressure so as to be moved in the direction to open the port 91e, whereas the elastic force of the spring 94 corresponding to the transmission ratio detected by the sensor shoe 95 urges the spool 92 in the direction to close the port 91e.

Designating the difference between pressure receiving areas of the spool 92 at the port 91c as $A_L$ and between pressure receiving areas at the port 91f as $A_C$, the relationship between the line pressure $P_L$ and the spring force F exerted by the spring 94 when the solenoid operated valve 97 is not energized to drain the oil at the port 91f is expressed as follows.

$$A_L \times P_L = F$$

Thus, the line pressure $P_L$ is controlled in accordance with the equation of $P_L = F/A_L$ to a higher value. When the solenoid of the solenoid operated valve 97 is energized to apply the oil to the port 91f, the relationship is expressed as $$(A_L + A_C) \times P_L = F$$

Thus, the line pressure $P_L$ is controlled to a lower value in accordance with $P_L = F/(A_L + A_C)$. The sensor shoe 95 is moved to the right in FIG. 2b as the transmission ratio decreases, reducing the force of the spring 84 to lower the line pressure. The line pressure exerts on the belt 34 at a proper force dependent on the transmission ratio so as not to cause the belt to slip on the pulleys.

A nozzle 77 provided adjacent an inner periphery of the belt 34 is supplied with oil through a passage 75d having an orifice 86b to eject the oil to the belt 34 to lubricate it. The passage 75d is communicated with the passage 75a through the lubricating oil pipe 96. The passage 75a is communicated with a passage 75e and with the oil reservoir 70 through a check valve 79 and an oil cooler 80, and further communicated with a nozzle 78 provided in the groove 38c of the drive pulley cylinder 38a so as to lubricate the pulleys. The driven pulley 37 has a balancer chamber 39c formed adjacent the oil chamber 39b opposite to the disc 37b, which is supplied with oil through a passage 81 communicated downstream of the oil cooler 80, thereby counterbalancing a centrifugal oil pressure in the oil chamber 39b.

The transmission ratio control valve 100 has an annular groove 102a formed on the spool 102 so as to communicate the port 101b with the port 101c or port 101d for supplying or discharging oil to or from the drive pulley servo chamber 38b in dependency on the position of the spool 102.

Figure 4B:
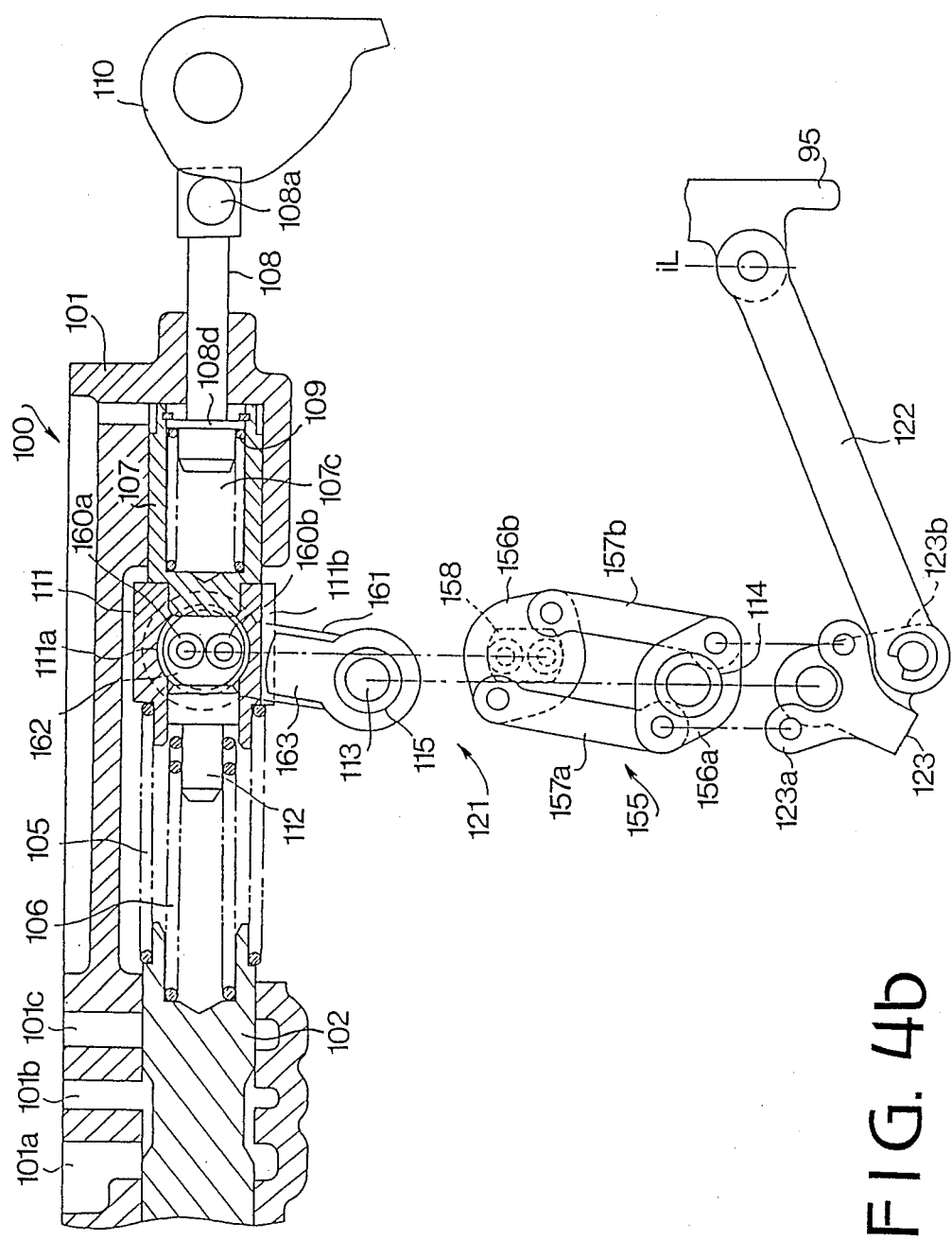
FIG. 4b is an exploded view of a modulator device.

As shown in FIG. 4b, the plunger 107 is slidably mounted in the valve body 101 and has an axial cavity 107c. A rod 108 is axially slidably mounted in the valve body 101, and a flange 108d of the rod 108 is slidably engaged with the wall of the cavity 107c. A spring 109 is provided between the flange 108d and the plunger 107. Both end chambers of the transmission ratio control valve 100 are supplied with the pitot pressure. A roller 108a provided at an end of the rod 108 engages with a cam 110 which is operatively connected to an accelerator pedal (not shown) of the vehicle so as to be rotated in dependency on the depression of the pedal.

The modulator 120 has a pressure controller 121 provided between the plunger 107 and the spool 102 of the transmission ratio control valve and a link assembly 122 connected to the sensor shoe 95 at one end and to the controller 121 at the other end. The controller 121 has a guide member 111 and a plunger 112 provided in the guide member. A spring 105 is disposed between the spool 102 and the guide member 111, and a spring 106 is provided between the spool 102 and the plunger 112.

The controller 121 is described hereinafter in detail with reference to FIGS. 4a and 4b. The transmission ratio control valve 100, the modulator 120 and the pressure regulator valve 90 are disposed in a valve block 150. The controller 121 comprises a horizontal shaft 113 which is securely mounted on a body 151 of the valve block 150, a parallel linkage 155 pivotally mounted on the shaft 113, and a U-shaped connecting member 123 connecting the linkage 155 with the link 122. On the shaft 113 is rotatably mounted a hub 114 which is integral with a lever 156a of the parallel linkage 155 (FIG. 4a). Pivotally connected to the lever 156a are parallel arms 157a and 157b. The arms 157a and 157b are connected to a lever 156b which is parallel to the lever 156a to form the parallel linkage 155.

The lever 156b has an integral supporting member 158 to which a pair of shafts 159a and 159b are secured. The shafts 159a and 159b penetrate the guide member 111 and are secured to a supporting member 162 which is secured to an arm 161 fixedly mounted on the shaft 113 through a sleeve 115. Rollers 160a and 160b are rotatably mounted on respective shafts 159a and 159b. The guide member 111 has an axial groove 111b on the center line of the upper periphery thereof. In the groove 111b, a plate 163 secured to the sleeve 115 on the shaft 113 is engaged for preventing the guide member 111 from rotating.

As shown in FIG. 4b, the connecting member 123 has a bifurcation 123a at an end thereof to be connected to the lever 156a. A lever portion 123b of the connecting member 123 is connected to the link 122.

Referring to FIG. 2, a select position detecting valve 130 comprises a valve body 131, a valve 133 having a drain aperture 132 which is slidably mounted in the valve body 131, a spring 134 for urging the valve 132 to a cam 135 which rotates according to the position of the selector lever 136. The cam 135 has a lobe 135a which is corresponding to D, N, R range positions, and lobes 135b formed in the both sides of the lobe 135a, corresponding to P and Ds range positions. At the D, N, R range positions, the lobe 135a pushes the valve 133 in the direction to close the drain aperture 132, so that actuating oil pressure is built up. At the P and Ds range positions, the valve 133 moves outwards to open the drain aperture 133 to drain the oil therefrom, so that the oil pressure in the passages 75b and 75c is reduced. At that time the oil pressure in the oil passage 75b decreases gradually, because of an orifice 86a provided in the oil passage 75b. The oil pressure is applied to an actuator 140.

The actuator 140 comprises a cylinder 141, a piston 142 which is slidably mounted in the cylinder 141, and a spring 143 for urging the piston 142 to a piston chamber 144 to which actuating oil pressure is applied through a passage 75c. A correction lever 146 rotatably supported by a pin 146a is provided between the sensor shoe 95 and the actuator 140. The lever 146 has a finger 146b which is engageable with a hook 142a of an outer end of a rod of the piston 142, and a lobe 146c which is engageable with a pin 108b on the rod 108 of the transmission ratio control valve 100. At the P range or Ds range, since no actuating oil pressure exists, piston 142 presses the finger 146b to rotate the lever 146 about the pin 146a. Consequently the lobe 146c engages the pin 108b to push the rod 108 a predetermined stroke to the left in FIG. 2b, thereby changing the transmission zone to the side of high engine revolution. Thus, the releasing of the accelerator pedal at Ds range causes the downshift of the transmission, so that the engine braking effects. Under such a condition, when the transmission is downshifted to shift the disk 36b to the left, the sensor shoe 95 engages with the end of lever 146 to rotate it. Thus, the rod 108 and piston 142 are moved toward the right as the transmission ratio increases, and, at the maximum transmission ratio, the piston 142 is returned to the right end position.

Figure 7:
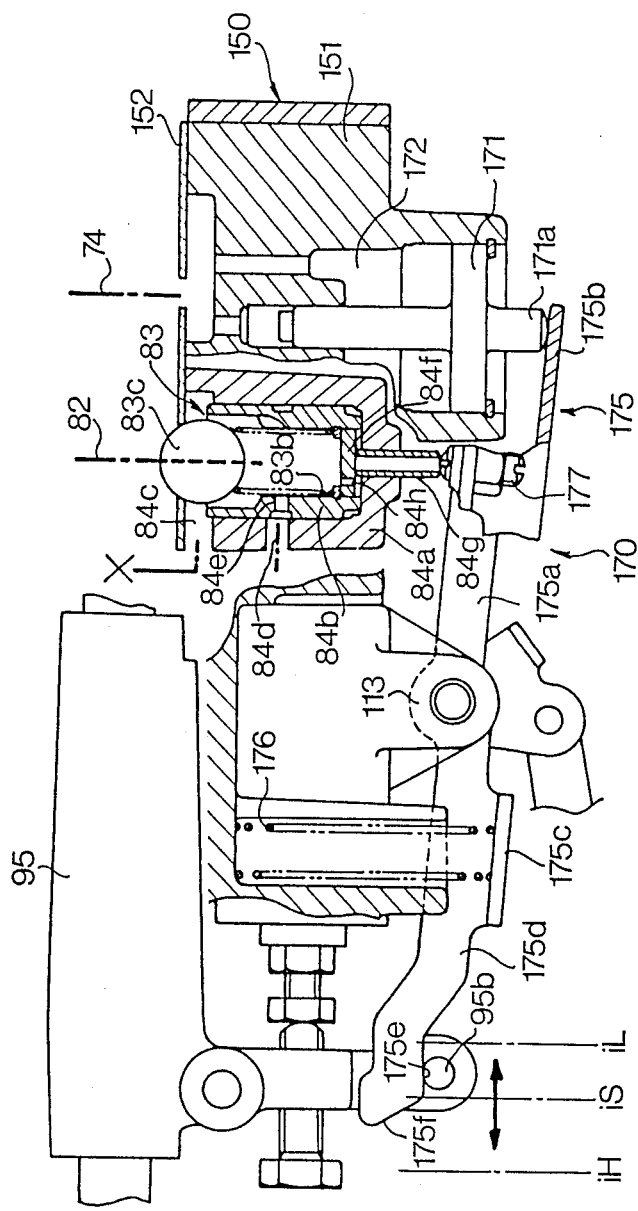
FIG. 7 is a sectional view of the valve block taken along a line VII—VII of FIG. 3, showing a shift lock device.

Referring to FIG. 7, a shift lock device 170 is further provided in the valve block 150 for controlling the check valve 83 in order to prevent the belt 34 of the continuously variable transmission from slipping on pulleys when the wheels of the vehicle are locked at braking of the vehicle. The shaft lock device 170 includes a check valve actuating device for the check valve 83. The check valve 83 comprises a cylinder 84a as a valve body, cylindrical spool 84b slidably mounted in the cylinder 84a, a ball 83c and a spring 83b for urging the ball 83c to close a drain port 84c defined by the cylinder 84a and a plate 152 fixed to the body 151 of the valve block 150. Accordingly, when the oil chamber 38a of the drive pulley 36 is drained, the oil applied through the passage 82 pushes the ball 83c against the urging of the spring 83b to open the drain port 84c. In accordance with the present invention, an opening 84d is formed in a wall of the cylinder 84a and an opening 84e is formed in a wall of the spool 84b. The openings 84d and 84e are adapted to register with each other when the spool 84b is at the most retracted position in the cylinder 84a. An actuating pipe 84g is slidably supported in the cylinder 84a, projecting out of the cylinder 84a to be abutted against a bottom 84f of the spool 84b. An opening 84h for communicating the space in the spool 84b with the actuating pipe 84g is formed in the bottom 84f.

The shift lock device 170 has a plunger 171 slidably mounted in a cylinder 172 formed in the body 151. The cylinder 172 is communicated with the oil passage 74 so that the plunger 171 is downwardly pressed by the pitot pressure in a high engine speed range. An end portion 171a of the plunger 171 projects out of the valve block 150.

Figure 3:
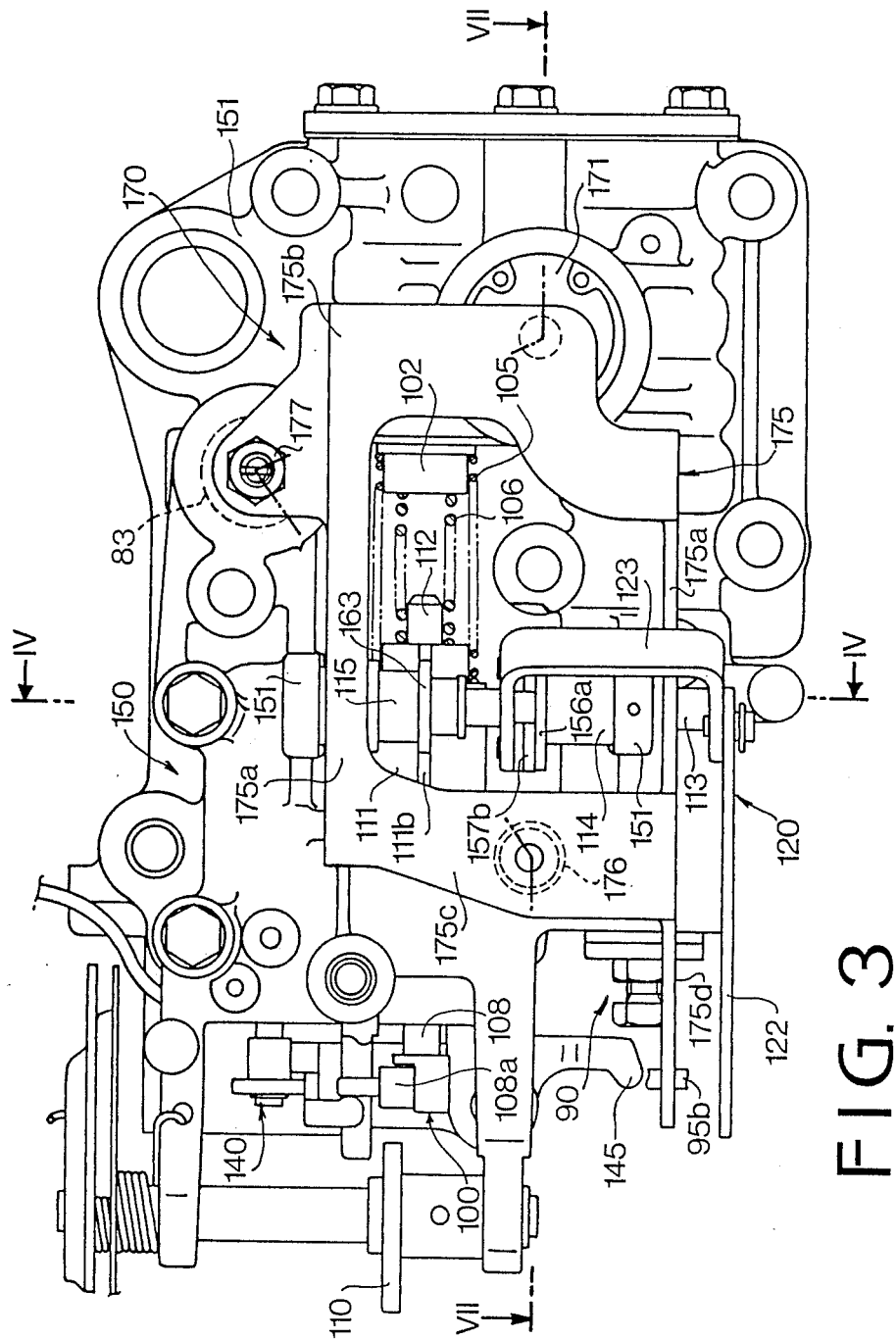
FIG. 3 is a plan view of a valve block used in the transmission of the present invention as viewed from the underside.

A shift lock arm 175 is provided to operate the actuating pipe 84g of the check valve 83. The shift lock arm 175 is pivotally mounted on the shaft 113. As shown in FIG. 3, the shift lock arm has opposing connecting portions 175a, an abutting side 175b which abuts against the end portion 171a of the plunger 171 and a supporting side 175c opposing the abutting side 175b. As shown in FIG. 7, a spring 176 is provided between the side 175c and the body 151 to urge the arm 175 counterclockwise. A projection 175d is formed on the supporting side 175c for engaging with the sensor shoe 95. The projecting 175d has a linear portion 175e which engages with a pin 95b on the sensor shoe 95 when the transmission ratio is larger than a predetermined ratio iS, for example 1.0, so as to restrict the rotation of the arm 175.

A taper portion 175f is formed at an end of the projection 175d to smoothly engage the portion 175e with the pin 95b. The shift lock arm 175 further has an adjusting screw 177 which abuts against the actuating pipe 84g.

The operation of the system is described hereinafter. While the vehicle is at a stop, the driven pulley servo chamber 39b is supplied with the line pressure adjusted by the pressure regulator valve 90 through the passages 71a, 71b, and the drive pulley servo chamber 38b is drained, since the spool 102 is at the left end position by the spring. Thus, the driving belt 34 engages with the driven pulley 37 at a maximum running diameter to provide the largest transmission ratio iL (low speed stage). On the other hand, the selector lever 136 is at the N range position to select the N range, so that the drain aperture 132 of the select position detecting valve 130 is closed. When the D range is selected, the input shaft 13 and the main shaft 20 are connected to each other in the selector device 2 by the selector lever 136.

At that time, since the accelerator pedal is released, the cam 110 is at substantially vertical position. Accordingly, the rod 108 projects out of the valve body 101 so that minimum load is exerted on the spring 105.

When the accelerator pedal is depressed, the electromagnetic powder clutch 1 is excited by a clutch current, transmitting the engine power to the drive pulley 36. The power of the engine is transmitted to the output shaft 35 at the largest transmission ratio by the driving belt 34 and driven pulley 37, and further transmitted to axles of the driving wheels. Thus, the vehicle is started.

When the depression of accelerator pedal exceeds a predetermined degree, the cam 110 is rotated to a position shown in FIGS. 4a and 4b, thereby pressing the rod 108 to the left. Thus, a larger load is exerted on the spring 105 of the transmission ratio control valve 100.

Figure 5A:
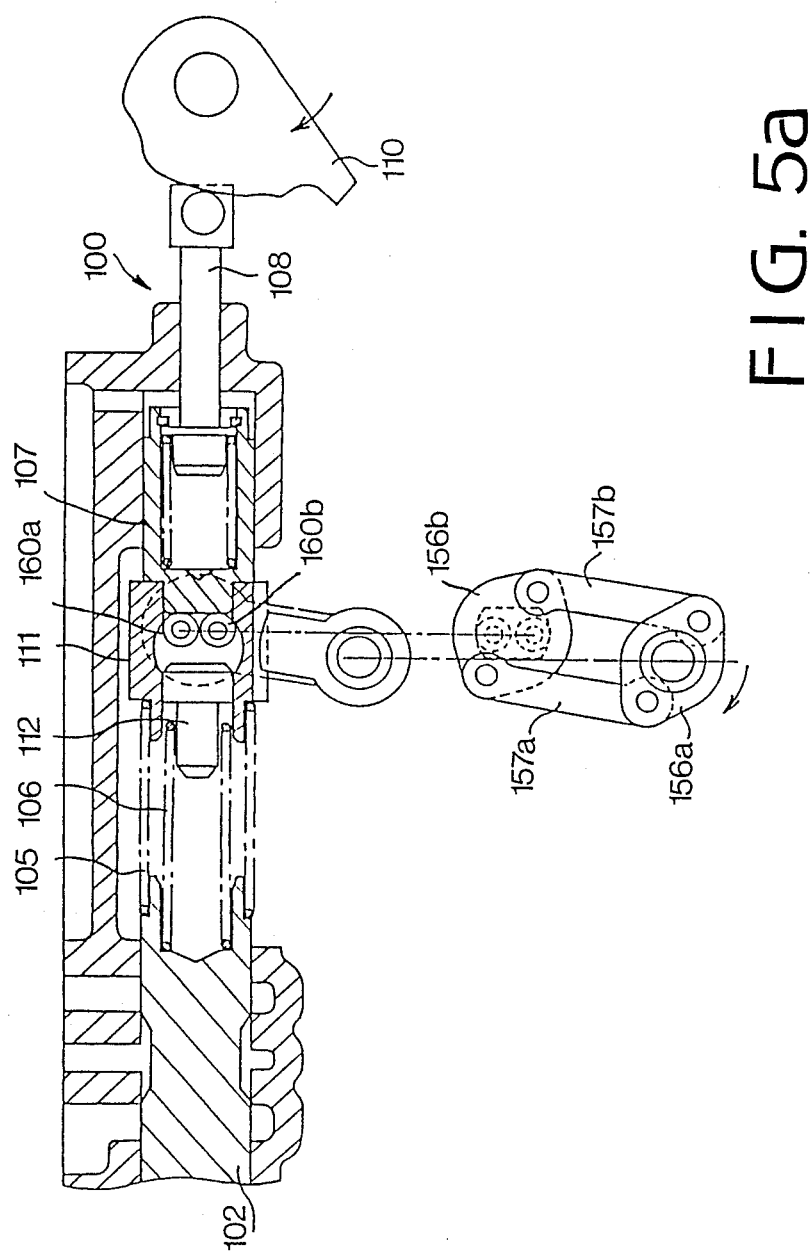
FIGS. 5a and 5b show sectional views of the modulator device, for describing the operation thereof.

At the largest transmission ratio, the sensor shoe 95 is positioned at the left end position. Thus, levers 156a and 156b are tilted as shown in FIG. 5a so that the rollers 160a and 160b are substantially vertically disposed, that is, the roller 160b is disposed directly under the roller 160a. Accordingly, the plunger 112 is retracted in the guide member, disengaging from the spring 106. Therefore, the spool 102 is urged by a small force of the spring 105 only so that it is balanced by a relatively small pitot pressure applied to the chamber 101a. Consequently, the transmission starts to upshift at a low engine speed at a point $P_1$ shown in FIG. 6.

As the transmission is upshifted, the sensor shoe 95 shifts to the right, whereby rotating the connecting member 123 in the counterclockwise direction (FIG. 4b). The lever 156a and hence the lever 156b are rotated in the counterclockwise direction as shown by an arrow in FIG. 5b. As a result, the rollers 160a and 160b are moved to a diagonal position so that the roller 160a abuts against the plunger 112. The plunger 112 is moved to the left. Until the plunger 112 attaches the spring 106 at a point $P_2$, the transmission ratio changes along a line $l_1$, keeping the engine speed constant. After the plunger 112 engaged the spring 106, the spool 102 is urged to the left by the springs 105 and 106.

Accordingly, the transmission is upshifted along a transmission ratio changing line $l_2$ from point $P_2$ with increase of the engine speed.

Figure 5B:
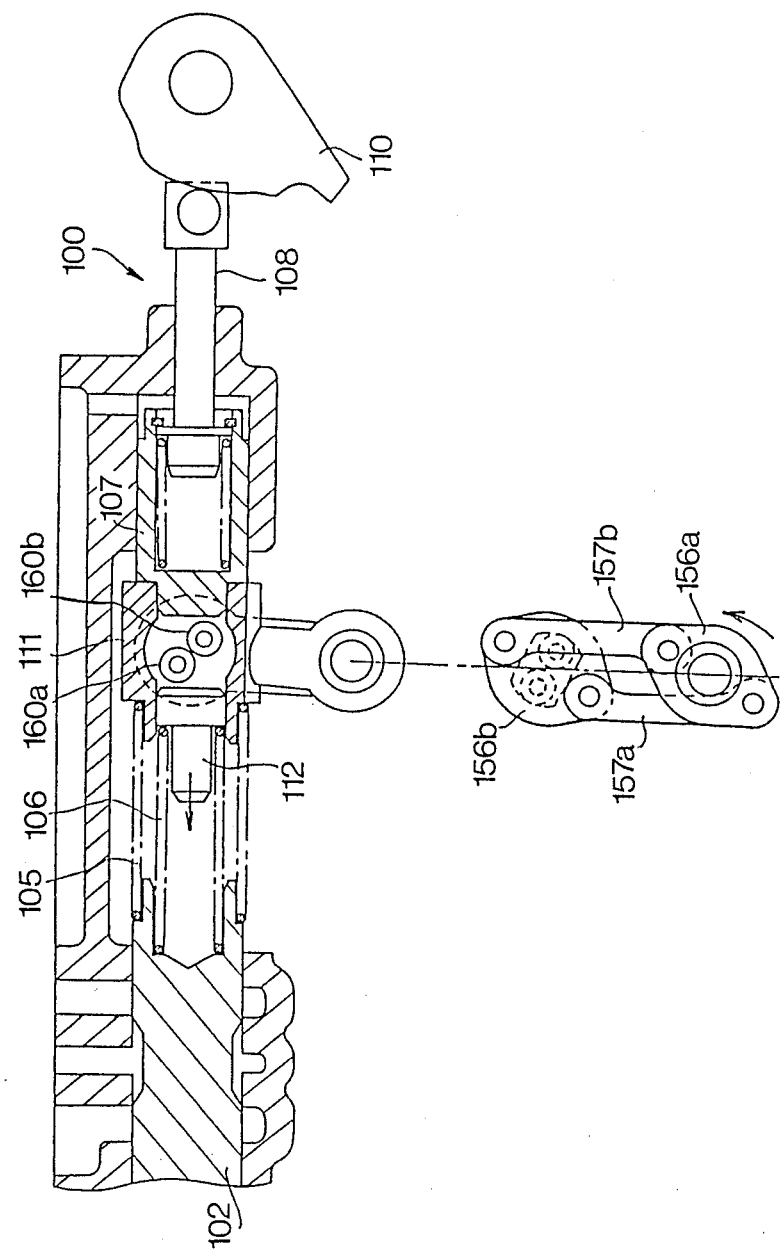

When the accelerator pedal is released at a point $P_3$, the shift cam 110 returns to the initial vertical position so that the load on the springs 105 and 106 is quickly reduced. Accordingly, the spool 102 is shifted to the right to communicate the port 101b with the port 101d, thereby applying oil to the chamber 38b. Thus, the transmission ratio starts to upshift to the smallest transmission ratio iH. Consequently, the rollers 160a and 160b are disposed horizontally as shown in FIG. 5b so that the distance between the plunger 112 and 107 becomes maximum.

Figure 6:
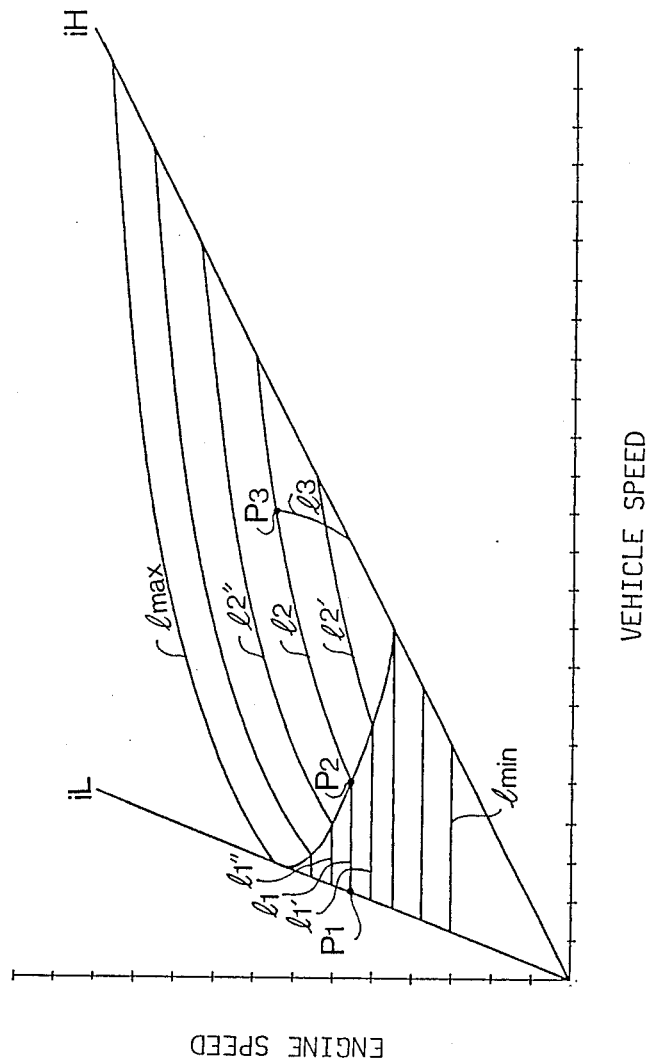
FIG. 6 shows a relationship between vehicle speed and engine speed.

As the shift cam 110 rotates, the guide member 111 moves, while the parallel linkage 155 keeps the angular position of the levers 156a and 156b. Thus, the relative position of the rollers 160a and 160b to the plunger 112 is maintained irrespective of the depressing degree of the accelerator pedal. When the depressing degree is small, since the distance between the spring 106 and the plunger 112 is large, the transmission is upshifted along lower transmission ratio changing lines $l_1'$ and $l_2'$ as shown in FIG. 6. The lines $l_1''$ and $l_2''$ are transmission ratio changing lines when the depressing degree of the accelerator pedal is larger.

The operation of the shift lock device 170 is described hereinafter with reference to FIGS. 7, 8 and 9a to 9e.

In a low engine speed range at a large transmission ratio, the pin 95b of the sensor shoe 95 engages with the projection 175d of the shift lock arm 175 at linear portion 175e. Consequently, while the vehicle is at a stop, or driven at a low speed, the shift lock arm 175 is slanted as shown in FIG. 7 against the urging of the spring 176. Thus, the actuating pipe 84g is projected out of the cylinder 84a so that the spool 84b is located at the innermost position of the cylinder to open the drain port 84c, enabling the chamber 38b to be drained. When the vehicle is started and engine speed increases, the oil is applied to the chamber 38b to upshift the transmission.

As the transmission is upshifted, the sensor shoe 95 shifts to the left in FIG. 7 so that the linear portion 175e of the projection 175d no longer engages with the pin 95b. Thus, the shift lock arm 175 is able to rock about the shaft 113 in accordance with the pitot pressure.

When the vehicle is driven at a small transmission ratio at a high speed, a high pitot pressure is applied to the cylinder 172 of the shift lock device 170. Accordingly, the plunger 171 is downwardly pushed so that the end portion 171a urges the abutting side 175b of the shift lock arm 175 downward. Thus, the shift lock arm is kept at the slanted position.

Figure 8:
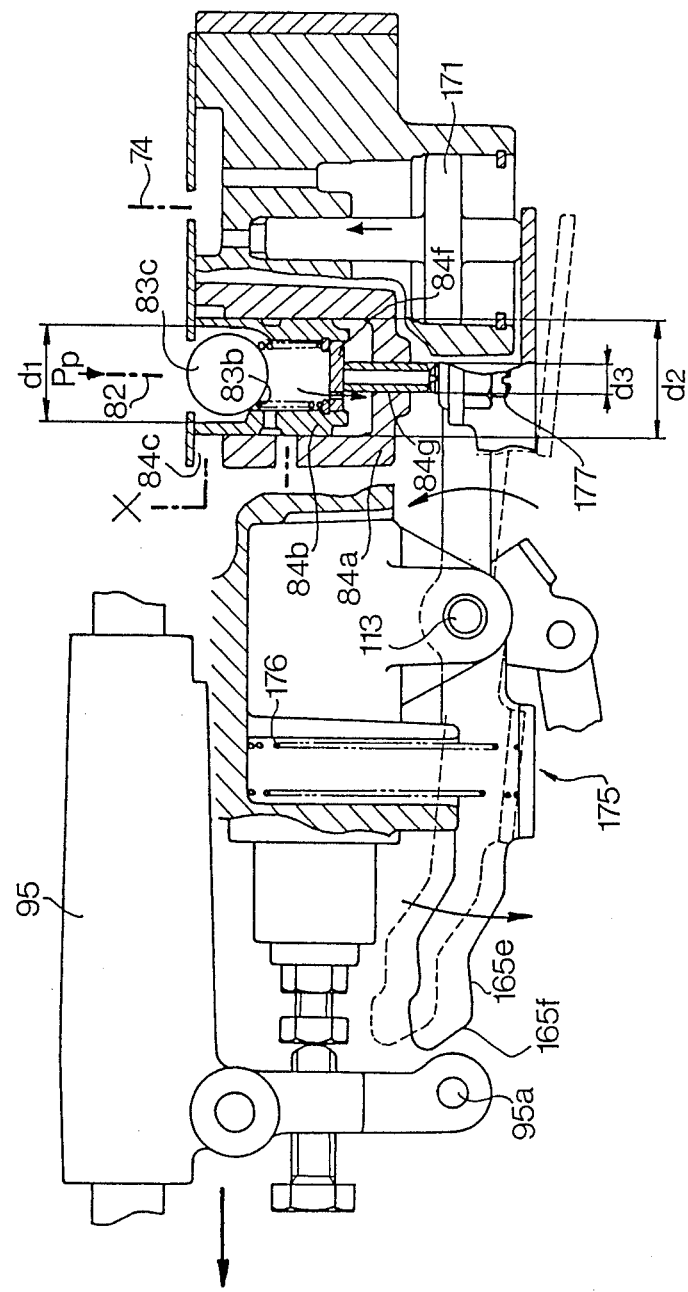
Figure 9A:
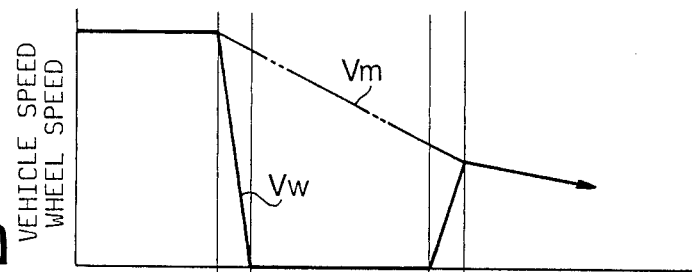
FIGS. 9a and 9e are graphs showing characteristics of vehicle speed and wheel speed, pitot pressure, pressure applied to a drive pulley of a continuously variable transmission, transmission ratio and line pressure, respectively.
Figure 9B:
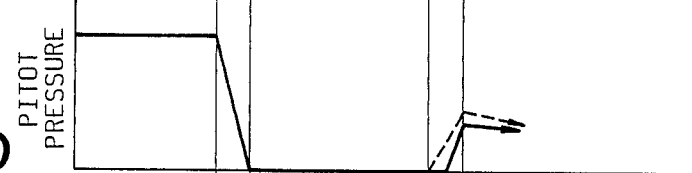
FIG. 9 is a sectional view of the shift lock device in operation.
Figure 9C:
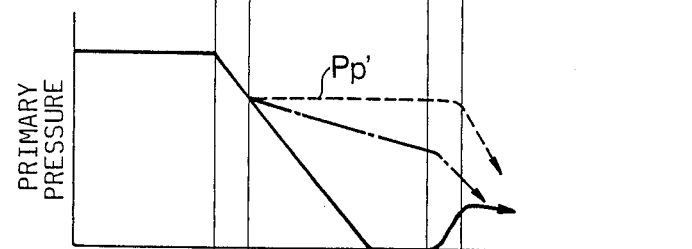

When the vehicle is braked on a road having a low friction coefficient and wheel are locked, the wheel speed Vw and hence the pitot pressure Pt rapidly decrease as shown in FIG. 9a and 9b. As a result, the plunger 171 is retracted and the shift lock arm 175 is rocked about the shaft 113 to be positioned horizontally by the spring 176 as shown in FIG. 8. The screw 177 pushed the actuating pipe 84g upwardly so that the spool 84b is upwardly shifted, thereby closing the drain port 84c. The actuating pipe 84g is also closed by the bottom 84f of the spool 84b. Thus, although the ports 101b and 101c of the transmission ratio control valve 100 are communicated with each other, the chamber 38a of the servo device 38 is not drained. Consequently, as shown by a dotted line Pp' in FIG. 9c and 9d, primary pressure in the chamber 38b is kept high to hold the transmission ratio at that time.

Openings 84d and 84e of the cylinder 84a and spool 84b are not aligned with each other, and the actuating pipe 84g closely abuts against the bottom 84f of the spool 84b. The oil in the spool 84b flows into the space between the cylinder 84a and the bottom 84f of spool 84b through the hole 84h formed in the bottom 84f. Thus, the check valve 83 is locked in a closed state.

The locking operation is explained hereinafter.

A downward force $F_D$ applied to the spool 84b is expressed as $$F_D = \pi \times d1^2 \times Pp/4$$

where d1 is the inner diameter of the spool 84b and the Pp is the pressure in the drain passage 82. An upward force $F_U$ applied to the bottom 84f of the spool 84b is expressed as $$F_U = \pi \times (d2^2 - d3^2) \times Pp/4$$

where d2 is the outer diameter of the spool 84b and d3 is the outer diameter of the actuating pipe 84g. If the diameters of the cylinder, spool and the actuating pipe are selected to satisfy the inequality $$\pi \times d1^2/4 < \pi \times (d2^2 - d3^2)/4,$$

the upward force $F_U$ becomes larger than the downward force $F_D$.

Figure 9D:
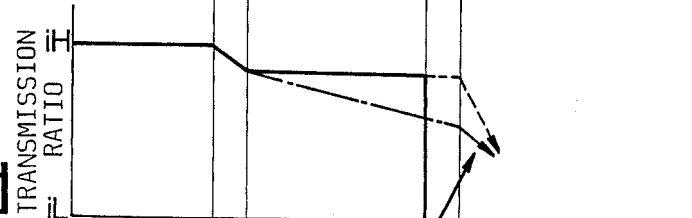
Figure 9E:
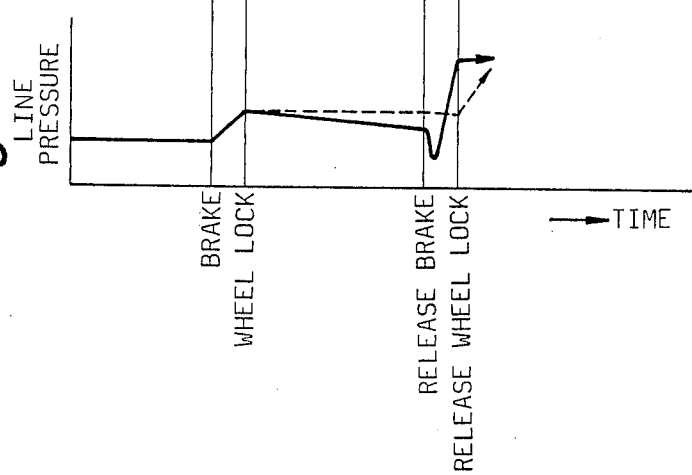

When the brake pedal is released, the wheel speed Vw increases so that the driven pulley 37 and the belt 34 are rapidly rotated. Since the drive pulley 36 is held by a high primary pressure, the pulley 36 is driven by the belt 34 without slipping. Consequently, the transmission ratio is kept constant as shown in FIG. 9d. As the rotational speed of the pulley 36 increases, the pitot pressure rises so that the plunger 171 is shifted to rock the arm 171 to the slanting position. The screw 177 is separated from the actuating pipe 84g, thereby opening the end of the actuating pipe 84g to release the pressure in the spool 84b. The spool 84b is moved to the innermost position in the cylinder 84a by the spring 83b so that the drain 84c is opened. Accordingly, the transmission is gradually downshifted as shown in FIG. 9d.

The opening 84e of the spool 84b may be adapted to slightly overlap the opening 84d of the cylinder 84a to form a small passage there-between when the drain port 84c of the check valve 83 is closed by the spool 84b. Consequently, the oil in the spool leaks from the openings 94e and 84d so that the pressure gradually decreases as shown by a dot-dash line in FIG. 9c. Accordingly, the transmission is downshifted as shown by a dot-dash line in FIG. 9d, thereby shifting the sensor shoe 95 to be engaged with the shift lock arm 175.

At the wheel-lock in a large transmission ratio range, since the rotation speed transmitted from wheels through the power train to the drive pulley 36 is low, belt 34 does not largely slip on the pulley. Therefore, although the wheels are locked at braking and the pitot pressure decreases, the shift lock device 170 is not operated due to the position of the sensor shoe 95.

Figure 10:
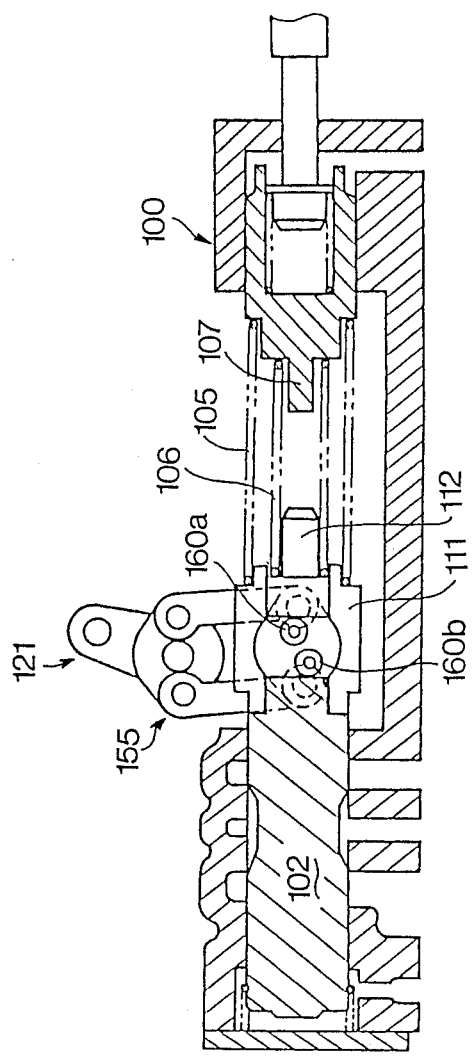
FIGS. 10 and 11 are plan views of other examples of the modulator device.
Figure 11:
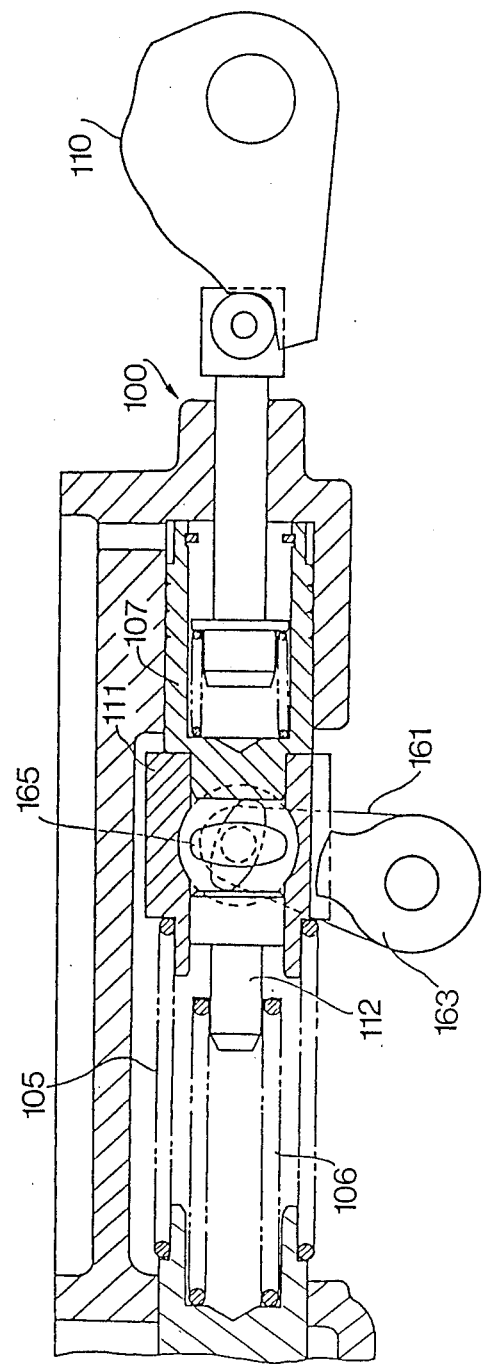

FIG. 10 and 11 show modifications of the present invention. As shown in FIG. 10, the transmission ratio control valve 100 is modified to dispose the springs 105 and 106 between the plunger 107 and the guide member and the plunger 11. In a second modification shown in FIG. 11, an oblong cam 165 is provided on the lever 156a instead of the rollers 160a and 160b. The load of the spring 106 can be changed in accordance with the shape of the cam 165.

Figure 12:
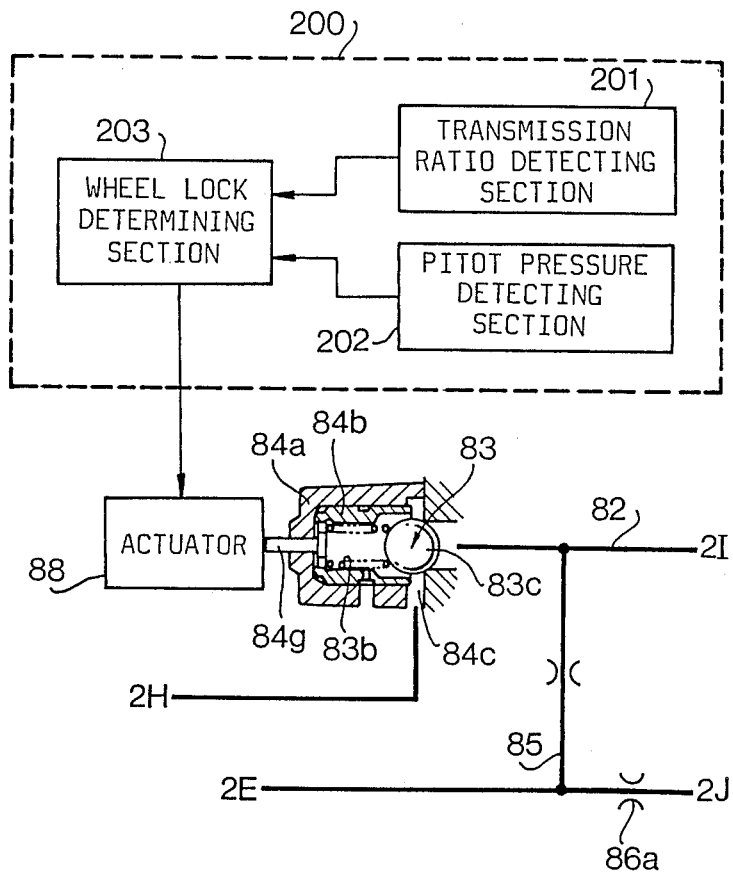
FIG. 12 shows a second embodiment of the shift lock device of the present invention.

FIG. 12 shows a second embodiment of the present invention where the check valve 83 is electronically operated.

The spool 84b of the check valve 83 is connected to a solenoid operated actuator 88 so as to be shifted to the right to close the drain port 84c. The actuator 88 is operated in dependency on a signal from an electronic control unit 200. The control unit 200 has a transmission ratio detector 201, a pitot pressure detector 202 and a wheel lock determining section 203 wherein the locking of the wheels of the vehicle is determined in accordance with the output signals of the detectors 201 and 202. In other words, when the pitot pressure is extremely low in a small transmission ratio range, the actuator 88 is operated to push the actuating pipe 84g. The operation of the check valve 83 is the same as in the first embodiment.

In accordance with the present invention, since the primary pressure in the oil chamber of the drive pulley is kept high when the wheels are locked, the slipping of the belt on the pulleys is prevented when the wheels recover speed.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An improved control system for a continuously variable transmission for transmitting the power of an automotive engine to driving wheels of a vehicle, the system comprising a drive pulley having a hydraulically shiftable disc and a hydraulic cylinder for operating the disc, a driven pulley having a hydraulically shiftable disc and a hydraulic cylinder for operating the disc, a belt engaged with both pulleys, a hydraulic circuit having a pump for supplying oil to both the hydraulic cylinders, a transmission ratio control valve having a plunger slidably mounted in a valve body, a spool slidably mounted in the valve body for controlling the oil supplied to the cylinder of the drive pulley and the oil drained from the cylinder to change the transmission ratio, and at least one spring provided between the plunger and the spool, a drain passage for draining the oil in the hydraulic cylinder of the drive pulley through the transmission ratio control valve and shifting means for shifting the plunger of the transmission ratio control valve in accordance with depression of an accelerator pedal of the vehicle, wherein the improvement comprises:
 a check valve provided in the drain passage,
 the check valve having a cylindrical spool slidably mounted in a body, a ball provided in the spool, a spring provided for urging a ball to close a drain port;
 the cylindrical spool being arranged to be shifted against the spring so as to close the drain port;
 an actuating member slidably mounted in the body so as to shift the cylindrical spool;
 detector means for detecting the locking of wheels of the vehicle and for producing a wheel lock signal;
 shift locking means responsive to the lock signal for actuating the actuating member to shift the cylindrical spool so as to close the drain port, whereby the draining of the oil in the cylinder of the drive pulley is stopped.

2. The system according to claim 1 further comprising
 pitot pressure apply means for applying pitot pressure dependent on engine speed to the spool of the transmission ratio control valve,
 the detector means being provided to respond to a reduction of the pitot pressure in a small transmission ratio range.

3. The system according to claim 2 wherein the shift locking means comprises a shift lock arm provided to be pivoted due to the reduction of the pitot pressure 4. The system according to claim 2 wherein the shift locking means is a solenoid operated actuator.

* * * * *